(12) United States Patent
Layne et al.

(10) Patent No.: US 6,481,567 B2
(45) Date of Patent: Nov. 19, 2002

(54) CONVEYOR SYSTEM WITH INTERMEDIATE DRIVE AND RELATED METHOD

(75) Inventors: James L. Layne, Bowling Green, KY (US); Stephen C. Fye, Glasgow, KY (US); Michael D. McDaniel, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 15 days.

(21) Appl. No.: 09/755,672

(22) Filed: Jan. 6, 2001

(65) Prior Publication Data

US 2002/0088689 A1 Jul. 11, 2002

(51) Int. Cl.[7] .............................................. B65G 23/00
(52) U.S. Cl. ..................................................... 198/834
(58) Field of Search .................................. 198/834, 832

(56) References Cited

U.S. PATENT DOCUMENTS

| | | | | |
|---|---|---|---|---|
| 3,910,406 A | * | 10/1975 | Pulver et al. | ................ 198/189 |
| 4,142,625 A | | 3/1979 | Bourgeois | |
| 4,515,265 A | * | 5/1985 | Hill | ............................ 198/821 |
| 4,930,621 A | * | 6/1990 | Brown et al. | ................ 198/831 |
| 4,953,693 A | * | 9/1990 | Draebel | ...................... 198/853 |
| 5,156,260 A | | 10/1992 | Dorner et al. | |
| 5,170,883 A | * | 12/1992 | Ledet et al. | ................ 198/834 |
| 5,303,817 A | | 4/1994 | Kissee | |
| 5,339,948 A | * | 8/1994 | Cox et al. | .................... 198/635 |
| 5,660,262 A | | 8/1997 | Landrum et al. | |
| 6,231,044 B1 | * | 5/2001 | Neary et al. | ................ 271/270 |
| 6,296,110 B1 | * | 10/2001 | Van Zijderveld et al. | ... 198/635 |

* cited by examiner

Primary Examiner—Douglas Hess
(74) Attorney, Agent, or Firm—King & Schickli, PLLC

(57) ABSTRACT

An intermediate drive for a conveyor system is disclosed. The drive includes at least one, and preferably a plurality of spaced parallel drive sprockets gang mounted on a common drive shaft. In the preferred embodiment, each sprocket engages a separate conveyor belt to drive it in the same direction in an endless path along a conveyor guide rail. Each guide rail includes a recessed portion that preferably matches the contour of the corresponding sprocket. By juxtaposing each sprocket in the recessed portion, engagement between each drive sprocket and the corresponding modular link belt is made. The drive may also be used along a curved section of the conveyor system, in which case the drive sprockets have different diameters for driving the belts at different speeds, and the contour of the recessed portions correspond to the adjacent drive sprocket.

27 Claims, 7 Drawing Sheets

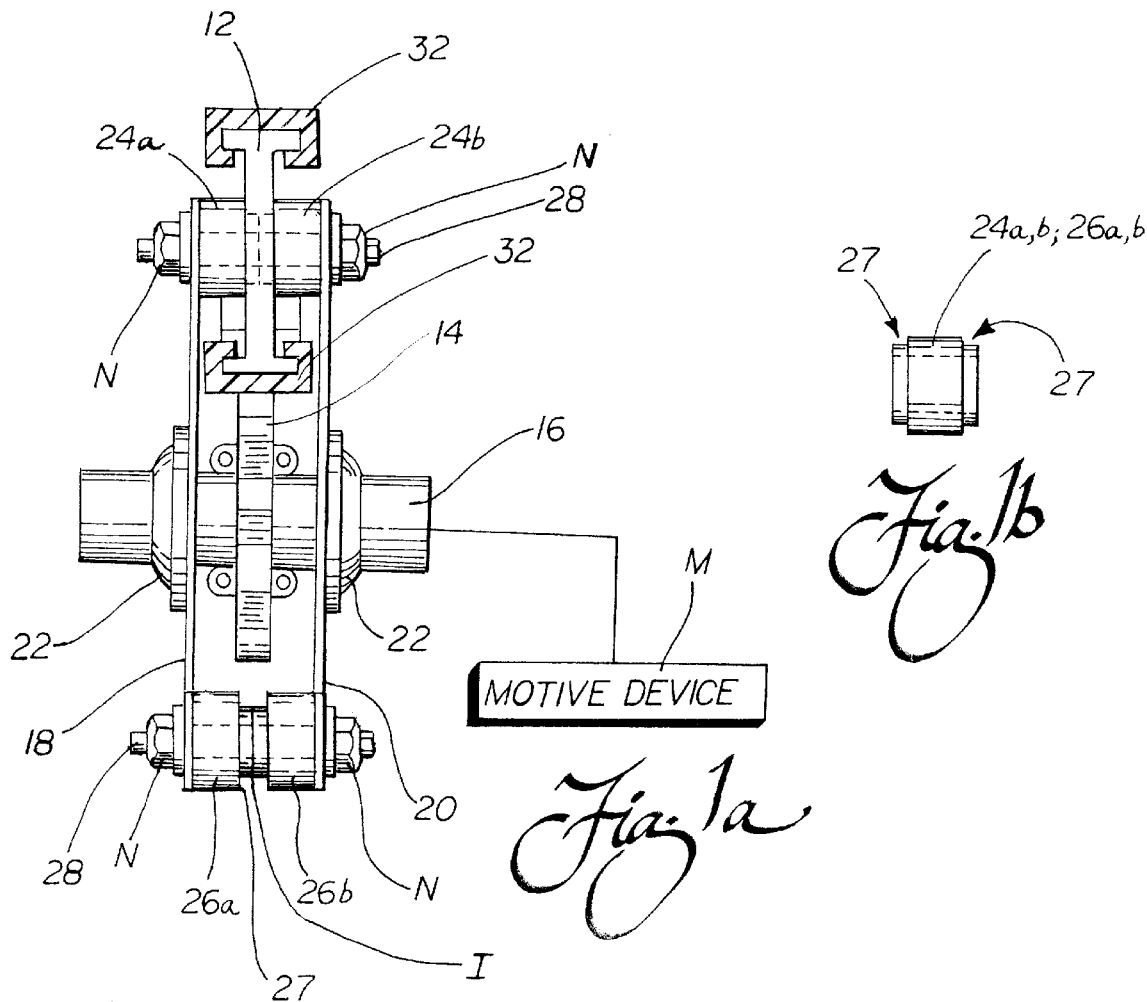
Fig. 1a
Fig. 1b
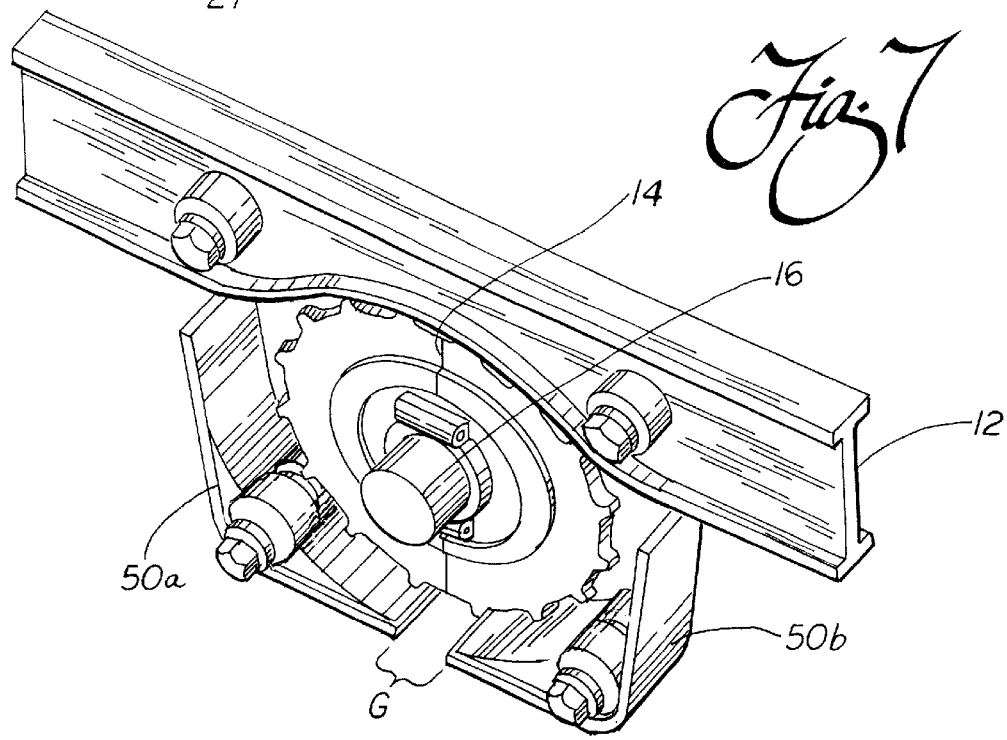
Fig. 7

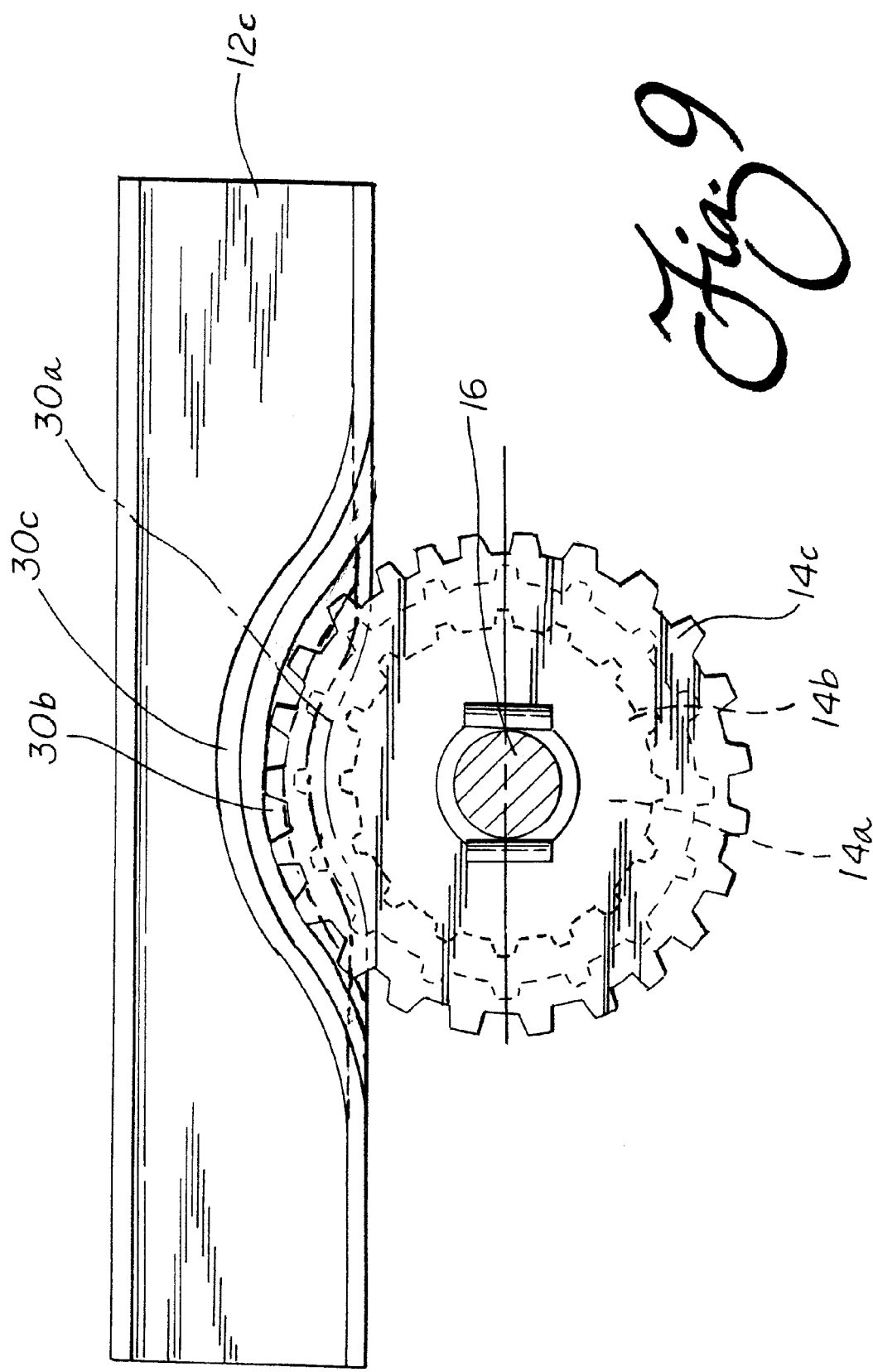

CONVEYOR SYSTEM WITH INTERMEDIATE DRIVE AND RELATED METHOD

TECHNICAL FIELD

The present invention relates to conveyors and, more particularly, to an intermediate drive and related method for driving at least one, and preferably a plurality of modular link conveyor belts forming part of a conveyor system.

BACKGROUND OF THE INVENTION

Conventional conveyor systems employing endless belts are typically driven at one by a drive sprocket coupled to a rotating shaft. At the opposite end, an idler sprocket coupled to an idler shaft provides the necessary support function. Together, the drive and idler sprockets support the belt as it traverses along a corresponding guide rail or like structure to convey or move articles from one location to another.

While this arrangement is acceptable for most uses, driving or assisting the driving of a belt using an intermediate drive is desirable in some situations. One example of an intermediate drive for a "holding" conveyor system is disclosed in U.S. Pat. No. 4,142,625 to Bourgeois. In this conveyor system, a pair of parallel belts having longitudinally extending drive chain portions include rollers for rolling along a flat support table. One belt is driven over a first sprocket coupled to an intermediate drive shaft, while the other is trained under a spaced second sprocket carried on the same shaft. As a result of this "over/under" arrangement, the parallel belts are simultaneously driven in opposite directions when the single shaft supporting both spaced drive sprockets is rotated.

While this intermediate drive arrangement may be suitable for its intended purpose, several limitations remain. The first and perhaps most obvious limitation is that a catenary is formed in each just upstream and just downstream of each drive sprocket. Catenaries are generally undesirable, since they increase the incidence with which objects may become trapped between the conveyor belt and the sprocket. An object trapped in this position may create a deleterious jam, which in turn results in corresponding system downtime until appropriate corrective action is taken. Also, even a single catenary generally prevents the conveyor system from being turned on its side or inverted during operation.

Another shortcoming is that the '625 patent does not suggest using the intermediate drive unit in conjunction with a conventional end drive unit. In particularly long sections of a conveyor, the weight of the corresponding endless belt and the concomitant increase in frictional resistance creates considerable stress and wear on both the sprocket and the links or other modular structures forming the belt. Of course, this increased wear is deleterious, since it reduces the service life of the main components in the conveyor system, which in turn increases the frequency with which maintenance is required.

In an effort to address and overcome these problems, U.S. Pat. No. 5,303,817 to Kissee discloses an intermediate drive assist for driving particularly long sections of a modular link conveyor belt. The drive assist employs a second, separately driven conveyor belt for simultaneously engaging and driving both the forward and return runs of the particular belt section. Each link forming the belt used in the assist includes a projection that interleaves in a corresponding recess in a link on the belt section. This is supposed to create an efficient force-transmitting engagement.

While this intermediate drive assist may generally enhance performance as compared to using an end drive alone, the improvement comes at a cost. Although the loading on the individual links may be reduced, the overall wear profile is increased, since the underside surfaces of the belt are engaged along both the forward and return runs. Requiring a second belt that must be tensioned and maintained throughout its life to ensure proper operation is also problematic. If the belt tension and wear is not kept in check, slipping may occur, which of course reduces efficiency and otherwise deleteriously effects the overall performance of the conveyor system.

Thus, a need is identified for an improved intermediate drive arrangement for driving at least one, and preferably a plurality of conveyor belts forming part of an overall conveyor system. In particular, the need for a catenary in a belt driven by an intermediate drive would be eliminated, which would not only improve performance, but also would reduce the incidence of deleterious jams. Wear could be reduced by providing an intermediate drive arrangement that engages the conveyor belt along only one of the runs, and most preferably, the return run. Also, the conveyor system with the intermediate drive should be capable of operating in any orientation, including even upside-down, without experiencing any reduction in efficiency or increase in wear. By addressing these needs, the end result would be a conveyor system having an intermediate drive that is an improvement over prior art proposals, especially in terms of operational flexibility and reliability.

SUMMARY OF THE INVENTION

In accordance with a first aspect of the invention, a conveyor system is disclosed comprising at least one conveyor belt formed of a plurality of modular links having at least one pair of guide tabs. At least one guide rail is provided for guiding the conveyor belt. The guide rail has upper and lower guide tracks for engaging the guide tabs of the links and guiding the conveyor belt along a forward and a return run, respectively. The guide rail also has a recessed portion along which the conveyor belt is guided. A drive for the belt includes at least one sprocket juxtaposed to the recessed portion of the guide rail. This sprocket engages the conveyor belt to drive it along the guide rail.

In the most preferred embodiment, the recessed portion of the guide rail adjacent to the drive is contoured or curved to correspond in shape to a peripheral surface of the sprocket. This allows for placement of the sprocket in juxtaposition to the belt. The modular links may further include a depending arm for carrying each guide tab, which is preferably an inwardly projecting transverse tab for engaging the guide tracks of the guide rail along the forward and return runs, respectively. The links may further include an apex and a pair of legs, with the apex including a slot for receiving a transverse member extending through an aperture in each leg of an adjacent link. As a result of this arrangement, the conveyor belt is capable of expanding and contracting in a longitudinal dimension.

The drive preferably includes a shaft for carrying the sprocket, along with first and second supports for supporting the shaft. The supports may be in the form of plates, each having an aperture for receiving the shaft. The support plates may be carried on either side of a single guide rail. A bushing may be positioned in the aperture in each support plate to create a low friction bearing surface for the shaft. A motive device is also provided for rotating the shaft, which in turn rotates the sprocket and drives the belt.

In one embodiment, a plurality of guide rails are provided for guiding a plurality of conveyor belts. Accordingly, the drive includes a plurality of sprockets mounted on a common shaft, each for driving at least one of the conveyor belts. Preferably, each of the plurality of guide rails is an I-beam guide rail. Like in the singular embodiment, the shaft is supported by first and second supports, but each support is carried by at least one of the plurality of guide rails (and most preferably, the first-in-line and last-in-line guide rails). Spacers may also be provided for spacing each shaft support from the adjacent guide rail, or the adjacent pairs of guide rails from each other.

In accordance with a second aspect of the present invention, a drive for a conveyor system having a plurality of conveyor belts, each driven along a separate guide rail having a recessed portion, is disclosed. The drive comprises at least one drive sprocket for engaging and driving each of the conveyor belts in the same direction. A shaft supports the drive sprockets, and first and second supports in turn provide support for the shaft. Each support is preferably carried by one of the plurality of guide rails, such that the shaft is supported and each sprocket is positioned in juxtaposition to the recessed portion of each separate guide rail for driving the corresponding conveyor belt.

Each conveyor belt is formed of a plurality of modular links, and each sprocket includes a plurality of teeth adapted for engaging and driving the links. Each sprocket may be a split sprocket including first and second halves held together by at least one fastener. The first and second supports may take the form of plates, each having an aperture for receiving the shaft. A bushing may be provided in each aperture to create a bearing surface for the shaft. At least one spacer is provided for spacing the first and second supports from the corresponding guide rail, as well as for spacing adjacent pairs of guide rails from each other. Each spacer may have recessed end potions that correspond in size and shape to locator holes formed in the guide rails and supports.

In accordance with a third aspect of the present invention, a method for driving a plurality of conveyor belts along a plurality of separate guide rails, each having a recessed portion, is disclosed. The method comprises providing a conveyor belt including a plurality of modular links having guide tabs for engaging each guide rail, positioning a drive including a plurality of sprockets such that each sprocket is juxtaposed to and at least in partial engagement with the conveyor belt along the recessed portion of each separate guide rail, and rotating the drive sprocket to simultaneously drive the plurality of conveyor belts in the same direction along the corresponding guide rails. In the preferred embodiment, each guide rail is an I-beam guide rail having forward and return runs, and the step of positioning the drive unit juxtaposed to the guide rail includes suspending first and second support plates from at least a two of the plurality of guide rails. Each support plate includes an aperture for receiving a shaft carrying the plurality of sprockets.

In accordance with a fourth aspect of the invention, a conveyor system is disclosed comprising a plurality of conveyor belts, each including a plurality of modular links; a guide rail corresponding to and guiding each conveyor belt, each guide rail having a contoured recessed portion along which said conveyor belt is guided; and a drive including a plurality of sprockets, each having a different diameter, and each juxtaposed to the recessed portion of the guide rail for engaging and driving the conveyor belt. The contour of the recessed portion on each guide rail corresponds to the diameter of the corresponding sprocket such that the proper engagement is maintained with the sprocket.

The drive may be positioned along a curve in the conveyor system, and the sprockets are coaxially mounted, gang-driven and sized to ensure that an outermost conveyor belt is driven at a higher rate of speed than an inner conveyor belt along the curve. Accordingly, an article being carried on the belts is kept at a desired orientation as the curve is traversed. To achieve this result in one embodiment, the sprocket for engaging an innermost conveyor belt has a smaller diameter and a fewer number of teeth than the sprocket for engaging the outermost conveyor belt in the curve.

In accordance with a fifth aspect of the present invention, a drive for use in a curved section of a conveyor system having a plurality of conveyor belts, with each belt being associated with a separate guide rail having a recessed portion with a different contour, is disclosed. The drive comprises a plurality of coaxially mounted drive sprockets having different diameters corresponding to a relative position of the adjacent conveyor belt along a radius of the curve. Each sprocket is held on a shaft in juxtaposition to the contoured recessed portion of the guide rail for engaging and driving each conveyor belt at a different speed.

BRIEF DESCRIPTION OF THE DRAWINGS

The accompanying drawings incorporated in and forming a part of the specification illustrate several aspects of the present invention and, together with the description, serve to explain the principles of the invention.

In the drawings:

FIG. 1a is a partially cross-sectional front or rear end view of the intermediate drive supported by a conveyor system including a single guide rail;

FIG. 1b is a side view of a particularly preferred embodiment of a spacer for spacing the drive supports from the guide rail or spacing adjacent pairs of guide rails from each other;

FIG. 4 is an exploded view of the intermediate drive used in a conveyor system having a single guide rail;

FIG. 7 is a perspective view of an alternate embodiment wherein the spacers for spacing the support plates from each other are in the form of guards for guarding the sprocket;

FIG. 8a is a cross-sectional view of the intermediate drive unit used in FIG. 8, taken along line 8a—8a; and FIG. 9 is a partially cross-sectional, side elevational view of the intermediate drive unit of FIG. 9 with the near side plate removed and the conveyor belts not shown.

DETAILED DESCRIPTION OF THE PREFERRED EMBODIMENTS

Figure 1:
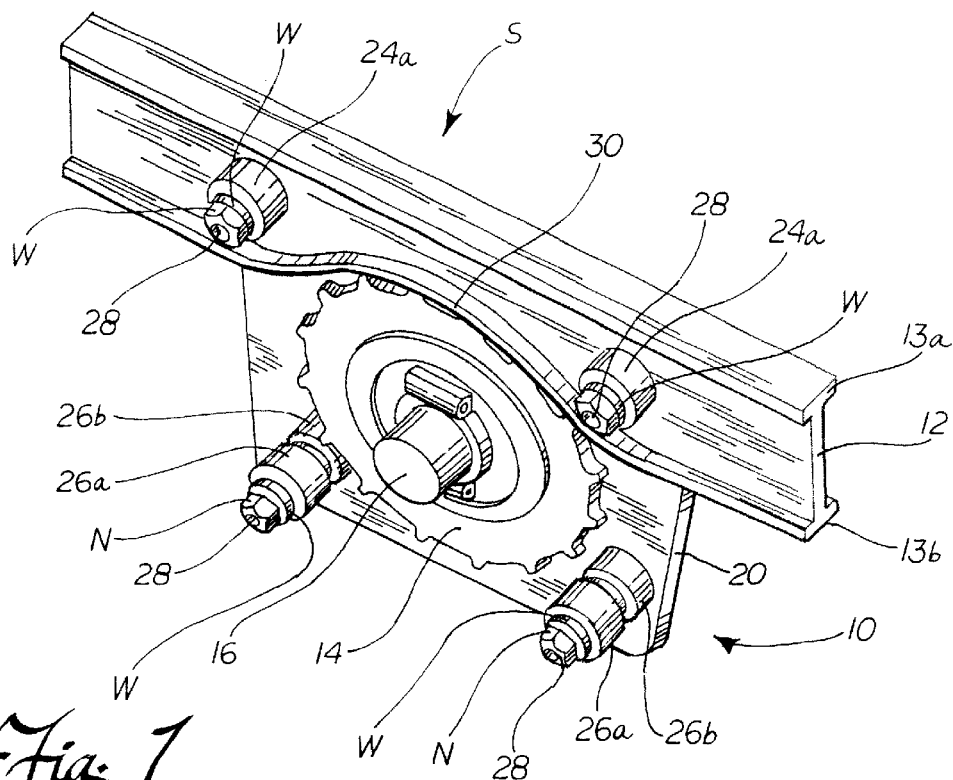
FIG. 1 is a cutaway perspective view of a single intermediate drive supported by a guide rail for a conveyor system, with the near support of the drive removed to show the juxtaposition of the sprocket with the recessed portion of the guide rail.

With reference to the perspective view of FIG. 1, there is shown a preferred embodiment of an intermediate drive 10 (also referred to as a driver or drive unit) for use in a conveyor system S. The conveyor system S includes a guide structure, which for purposes of the preferred embodiment is illustrated as a narrow-width guide rail 12 in the shape of an I-beam. As a result of this I-beam shape, the guide rail 12 includes integral upper and integral lower guide tracks 13a, 13b for guiding an endless conveyor belt formed of a plurality of modular links to create forward and gt return runs F, R (see FIGS. 1a, 2, and 5). The I-beam guide rail 12 is preferably formed from a single, unitary piece of lightweight plastic material, such as polypropylene. A full description of other possible versions of an I-beam guide rail 12 that may be used in the conveyor system S employing the intermediate drive 10 of the present invention (as well as one version of modular link conveyor belt specially adapted for use with such a guide rail) may be found in commonly assigned application Ser. No. 09/033,572, entitled "Modular Link Conveyor With I-Beam Guide Rail," now U.S. Pat. No. 6,202,834, the disclosure of which is incorporated herein by reference. As also described therein, the conveyor system S may include at least one end drive unit, in which case the intermediate drive 10 of the present invention would serve as a drive assist. However, it is within the broadest aspects of the invention to use the intermediate drive 10 alone to drive an endless conveyor belt.

The intermediate drive unit 10 or driver includes a sprocket 14 coupled to a shaft 16, which is in turn supported adjacent to the guide rail 12 of the conveyor system S. As perhaps best shown in FIGS. 1 and 2, support for the shaft 16 may be provided by a pair of plates 18, 20 (the near side plate 18 in FIG. 1 is removed to show the guide rail 12 and the sprocket 14, but see the end view of FIG. 1a). Instead of plates 18, 20, any equivalent rigid or semi-rigid structure capable of supporting the shaft 16 without interfering with the operation of the conveyor system S may be used. The plates 18, 20 are preferably formed of a durable material, such as metal, and may be carried on either side of the single guide rail 12 (see FIGS. 1 and 2), or instead carried by two or more different guide rails (such as in the embodiment where a plurality of guide rails are positioned in a side-by-side configuration to form a multi-lane conveyor system, see FIG. 5).

Each plate 18,20 includes an aperture A for receiving the shaft 16 (see FIG. 4). As best shown in the exploded view of FIG. 4, a bushing 22 may be installed in the aperture A in each plate 18, 20 to create a bearing surface for the shaft 16 (see FIG. 1a). The bushing 22 is preferably made of a material having enhanced tribological properties and wear-resistance to ensure a long service life. An example of a bushing (and in particular, a split bushing held together by an E-ring or other snap retainer of the type shown in FIG. 4) suitable for use in the drive unit 10 may be found in the above-referenced commonly assigned patent application, now U.S. Pat. No. 6,202,834.

Figure 2:
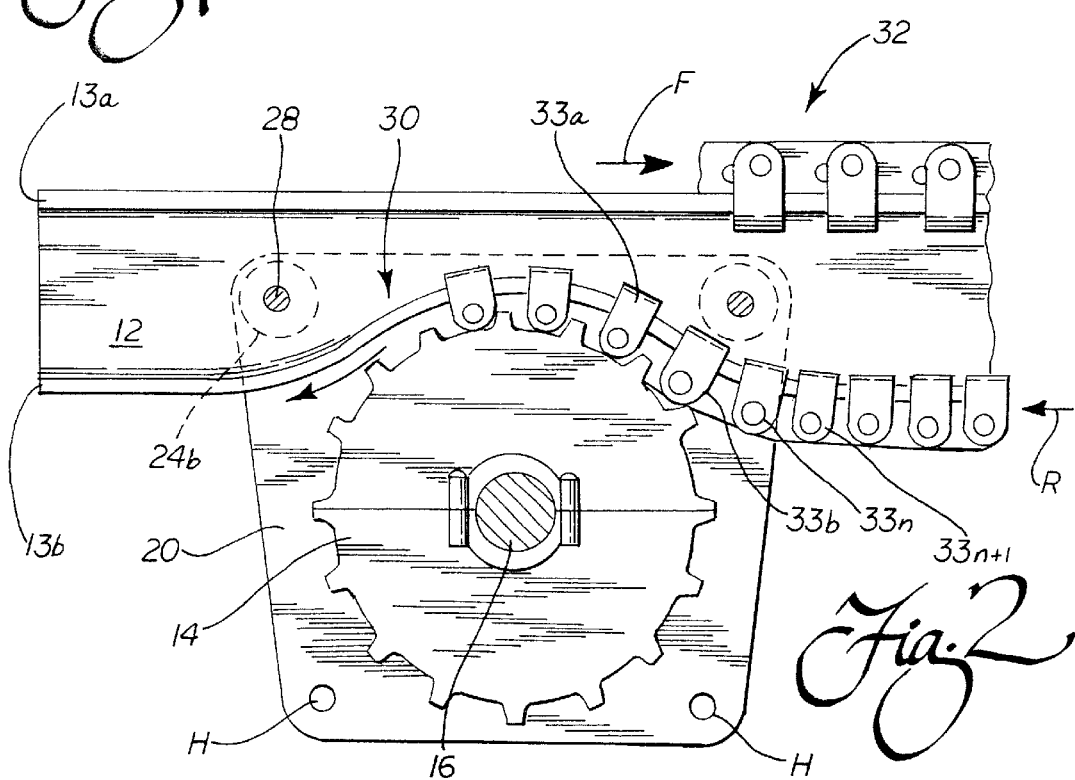
FIG. 2 is a partially cutaway, partially cross-sectional side view of the intermediate drive similar to FIG. 1, but also showing a modular link conveyor belt being driven along the upper and lower guide tracks of the guide rail.

As illustrated in FIGS. 1 and 2, a plurality of spacers may be used to create the desired spacing between the plates 18, 20, as well as to ensure that each plate is properly spaced from the adjacent side of the guide rail 12. FIG. 1a shows modular spacers 24a, 24b for spacing the top portion of each plate 18, 20 from the corresponding side of the guide rail 12, while similar or identical spacers 26a, 26b are used at the bottom of the plates 18, 20. The spacers 24a, 24b; 26a, 26b are inserted over the shaft of the connector used to secure the plates 18, 20 together, which are illustrated as elongated studs 28 having tapped ends that project through holes H formed in each corner of the support plate 18, 20 (see FIG. 4). Fasteners, such as nuts N or the like, are secured to the ends of the connectors or studs 28, and washers W may optionally be used to provide an engagement surface and ensure that the fasteners are held in place.

As shown in FIG. 1b, each spacer 24a, 24b for positioning adjacent to the guide rail 12 may have a recessed peripheral portion 27 adjacent to each planar end face. These recessed portions 27 may correspond in shape and size to locator holes H formed in both the guide rail 12 and the similar holes H in the support plates 18, 20 (see FIG. 4). Of course, if the corresponding holes are different sizes, then the recessed portion 27 at each end of the spacer 24a, 24b, may have a different diameter (not shown).

As noted above, the spacers 26a, 26b employed for spacing the bottom portions of the plates 18, 20 from each other may be of the same type as those used adjacent to the guide rail 12, or alternatively, a single elongated spacer (not shown) may be used, corresponding in width to the corresponding conveyor belt. One possible advantage of using the same type of spacers between the plates 18, 20 is that, when placed in an abutting relationship, a notch or other indicia I is created identifying the center of the guide rail 12. This may assist in properly aligning the sprocket 14 with the guide rail 12 during initial set-up procedures. Also, an advantage of using a plurality of modular spacers is that they may simply be added or taken away, as necessary, to create the desired spacing between the guide rail 12 and the support plates 18, 20, or between adjacent support plates. Preferably, the spacers 24a, 24b; 26a, 26b are formed of lightweight, durable plastic materials, such as polypropylene, but the use of other materials is of course possible.

With reference back to FIG. 1, the guide rail 12 is formed having a recessed portion 30, preferably adjacent to the lower guide track 13b for guiding the return run R of the conveyor belt 32. This recessed portion 30 is contoured or curved to correspond in shape to the periphery of the sprocket 14, which in the conventional arrangement is substantially circular. As should be appreciated, this recessed portion 30 provides the lower guide track 13b with a pair of opposed, curved lips and a curved outer surface along which the conveyor belt 32 is guided.

Figure 3A:
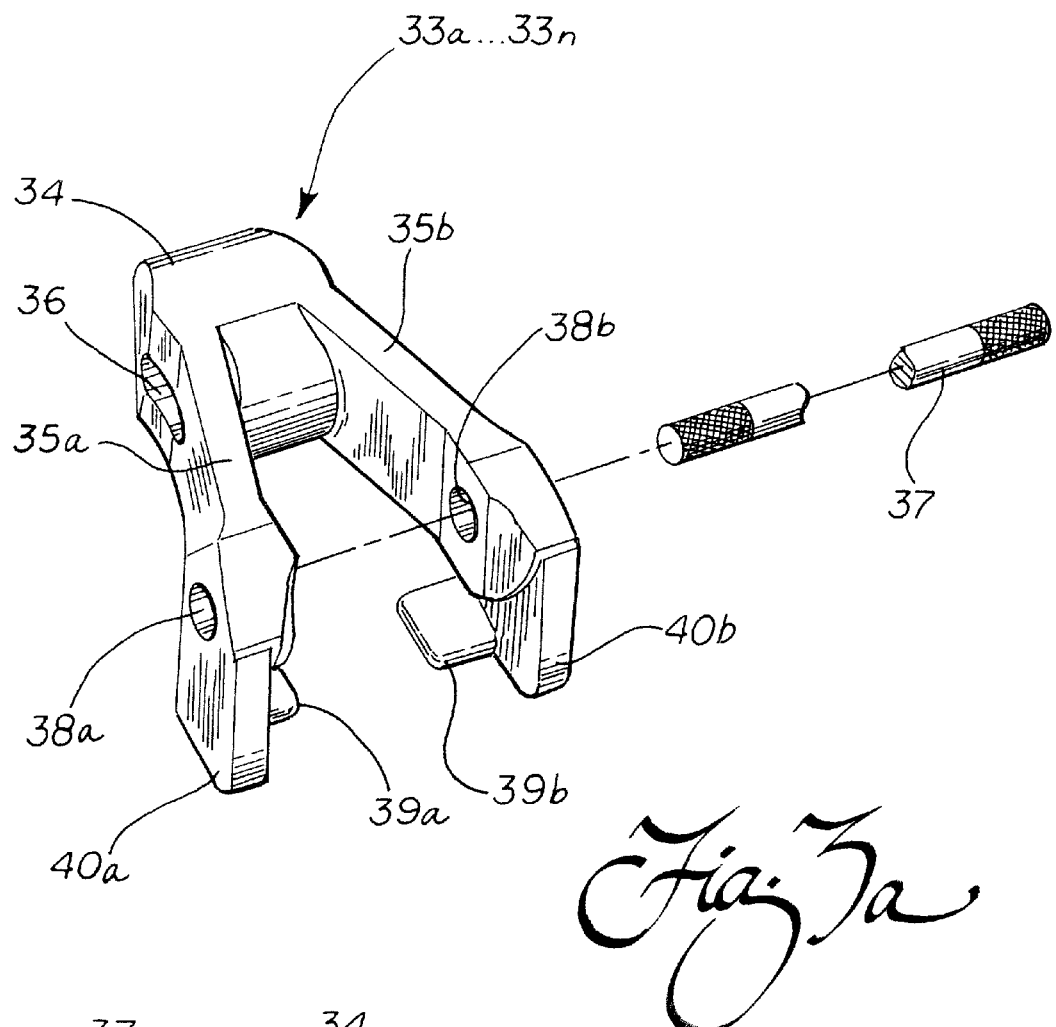
FIGS. 3a and 3b are different views of one possible version of a modular link for forming a conveyor belt for use in conjunction with the conveyor system of the present invention.
Figure 3B:
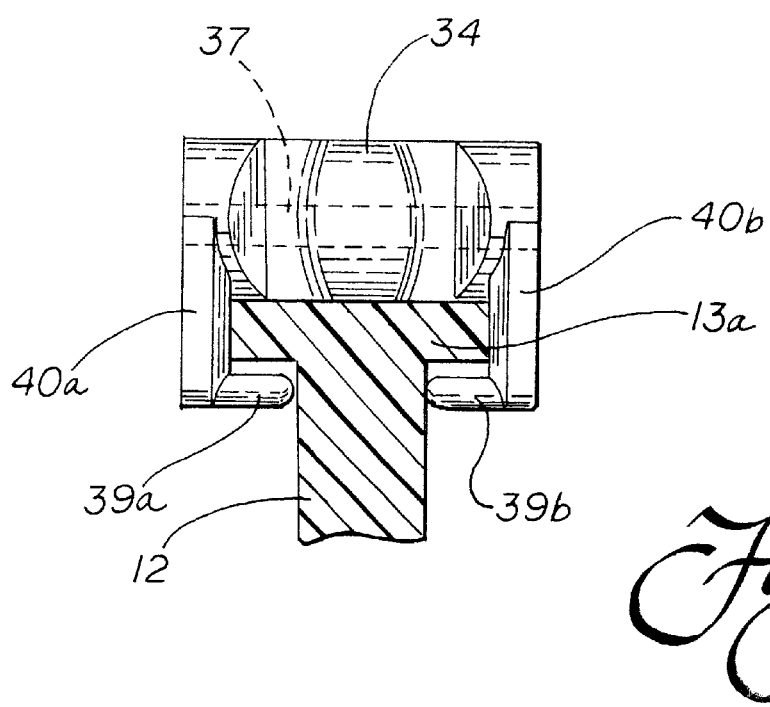

In the most preferred embodiment, the modular link conveyor belt 32 is comprised of a plurality of links 33a . . . 33n. As shown in FIGS. 3a and 3b, each link 33a preferably includes an apex 34 and a pair of legs 35a, 35b. Each apex 34 includes a slot 36 for receiving a transverse connector 37 extending through apertures 38a, 38b formed in the legs of an adjacent link (not shown). The connector 37 is shown having a burnished medial portion and knurled ends for creating a friction fit with apertures 38a, 38b formed in a "foot" portion of each leg 35a, 35b of the link 33a, but could instead be held in place using a separate, removable locking tab, as disclosed in commonly assigned U.S. Pat. Nos. 5,031,757 and 4,953,693, both of which are incorporated herein by reference. By interconnecting the links 33a . . . 33n in this manner, the belt 32 is advantageously capable of side-flexing to negotiate curves, elevational flexing to ramp up or down, or perhaps most importantly, longitudinally compressing or expanding. The open design thus created also facilitates cleaning, as may be frequently required when belts formed of modular links of the type disclosed are used to convey food products or other comestibles. It should also be appreciated that, while a narrow width belt 32 formed of a single link is depicted, any number of links could be used to form the belt (see, e.g., the '693 patent) or it could be formed of a single, relatively wide link (see, e.g., the '757 patent).

To guide the belt 32 along the forward run F, and to both guide and support the belt along the return run R, each link 33a . . . 33n may also includes a pair of guide tabs, such as inwardly extending or projecting transverse tabs 39a, 39b, for engaging the opposed outwardly projecting lips forming the upper and lower guide tracks 13a, 13b of the guide rail 12. Each tab 39a or 39b may project inwardly from an arm 40a, 40b depending from each leg of the link 33a . . . 33n. One advantage of using a belt formed at least partially of such links is that the catenary found in many prior art conveyor systems may be eliminated. This allows for the conveyor system S, including the guide rail 12 and the corresponding belt 32, to be inclined, declined, inverted, turned on its side, or positioned in any other orientation without significantly affecting performance. The links 33a . . . 33n are preferably formed of UHMW polyethylene, nylon, acetal, or other plastic materials, as explained in the '757 and '693 patents.

As should be appreciated from viewing FIGS. 1 and 2, the sprocket 14 includes a plurality of teeth for engaging the corresponding links 33a . . . 33n forming the modular link conveyor belt 32 along the return run R, as shown in FIG. 2. Specifically, as a first leading tooth of the sprocket 14 engages and drives a first link 33a forward by engaging the upper surface thereof adjacent to the apex 34 (the link being in the inverted position), the upper surface of the next-in-line link 33b (also inverted) is simultaneously engaged by the succeeding tooth, and so on, such that the conveyor belt 32 is driven (or assisted in being driven) along the guide rail 12 for both the return and forward runs F, R. To ensure proper engagement in the most preferred embodiment, the drive unit 10 is positioned such that the sprocket 14 is juxtaposed to the belt 32 adjacent to the recessed portion 30 of the guide rail 12. Preferably, the mounting of the shaft 16 is such that the engagement between the sprocket 14 and the corresponding links 33a . . . 33n is sufficient to ensure that an efficient, reliable drive or drive assist operation is achieved. As with the guide rail 12, the sprocket 14 is preferably fabricated from a relatively light, wear-resistant plastic material, but may include inserts, facings or other reinforcements made of a harder, abrasion-resistant material, such as metal, if desired.

One latent advantage afforded by this arrangement, especially where the intermediate drive 10 unit is used as a drive assist, is that any slack in the belt 32 may accumulate in the plurality of links just upstream of the drive sprocket 14. Since the spacing of the teeth on the sprocket 14 is substantially constant, each link 33a . . . 33n is individually engaged and moved along the curved portion 30 of the guide rail 12. Thus, in the case where there is slack in the belt 32 upstream of the drive sprocket 14 (see links $33_n$, $33_{n+1}$ in FIG. 2), the next-in-line or succeeding link $33_n$ initially waits unit the leading link 33b is moved a sufficient length to create the maximum longitudinal expansion. At that time, the next-in-line link $33_{n+1}$ is pulled along into position for engagement with the next tooth on the sprocket 14. As should be appreciated, this arrangement eliminates the need for a "pinch" roller, nose bar or other device for actively or passively tensioning the belt.

The sprocket 14 may be coupled directly to the shaft 16, such as by a transverse pin or other coupler (not shown). This improves efficiency by ensuring that the rotary motion is fully transmitted from the motive device M used to drive the shaft 16, such as a reversible electric motor. As should be appreciated, by using a reversible motor, the direction in which the belt 32 travels may be easily changed. In a most preferred embodiment, as shown in FIG. 4, the sprocket 14 is preferably a "split" sprocket having first and second halves 14a, 14b that mate and held together by fasteners (not numbered), such as screws or the like (see FIG. 4). One advantage of using a split sprocket arrangement is that it allows for the position of the sprocket 14 to be easily adjusted without repositioning the shaft 16. Of course, the split nature of this sprocket 14 also facilitates removal for replacement or servicing, as may be periodically required due to wear.

Figure 5:
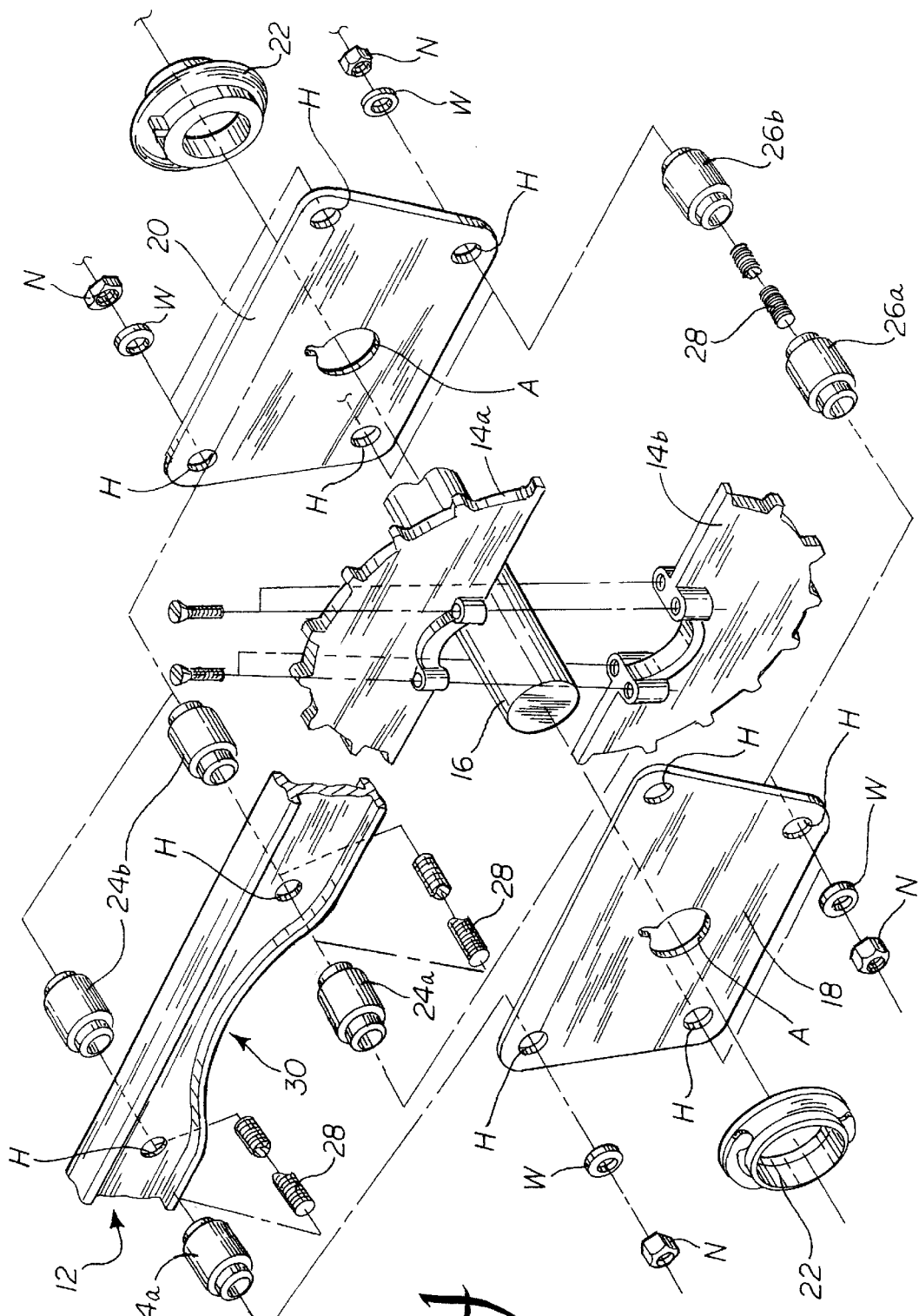
FIG. 5 is a perspective view of an intermediate drive for simultaneously driving a plurality of narrow width conveyor belts along parallel guide rails.
Figure 5:
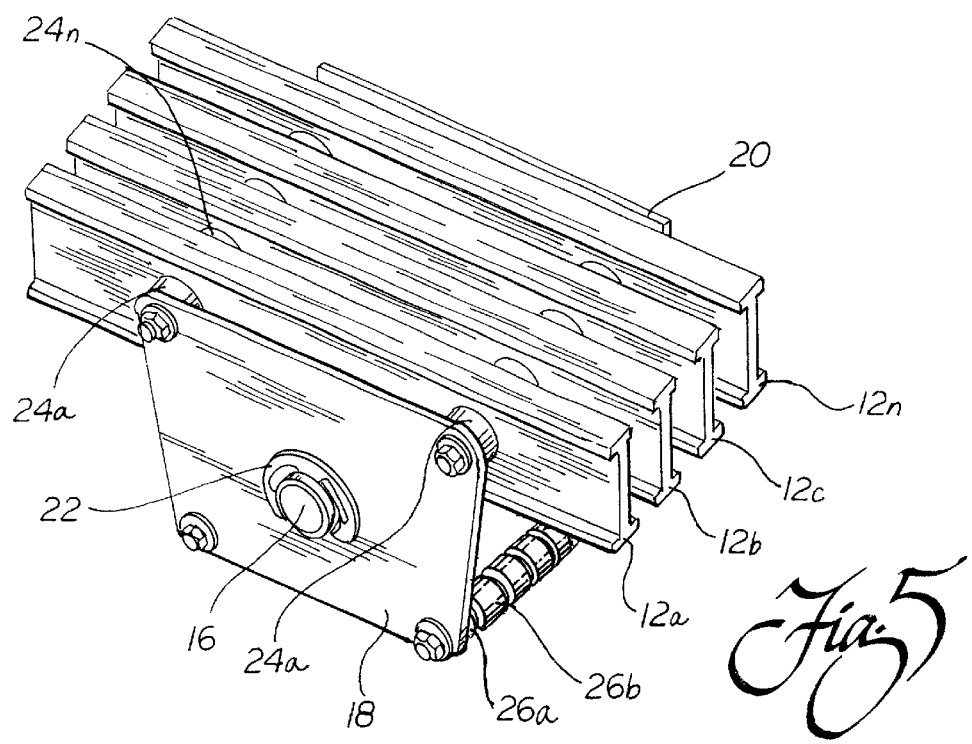
Figure 6:
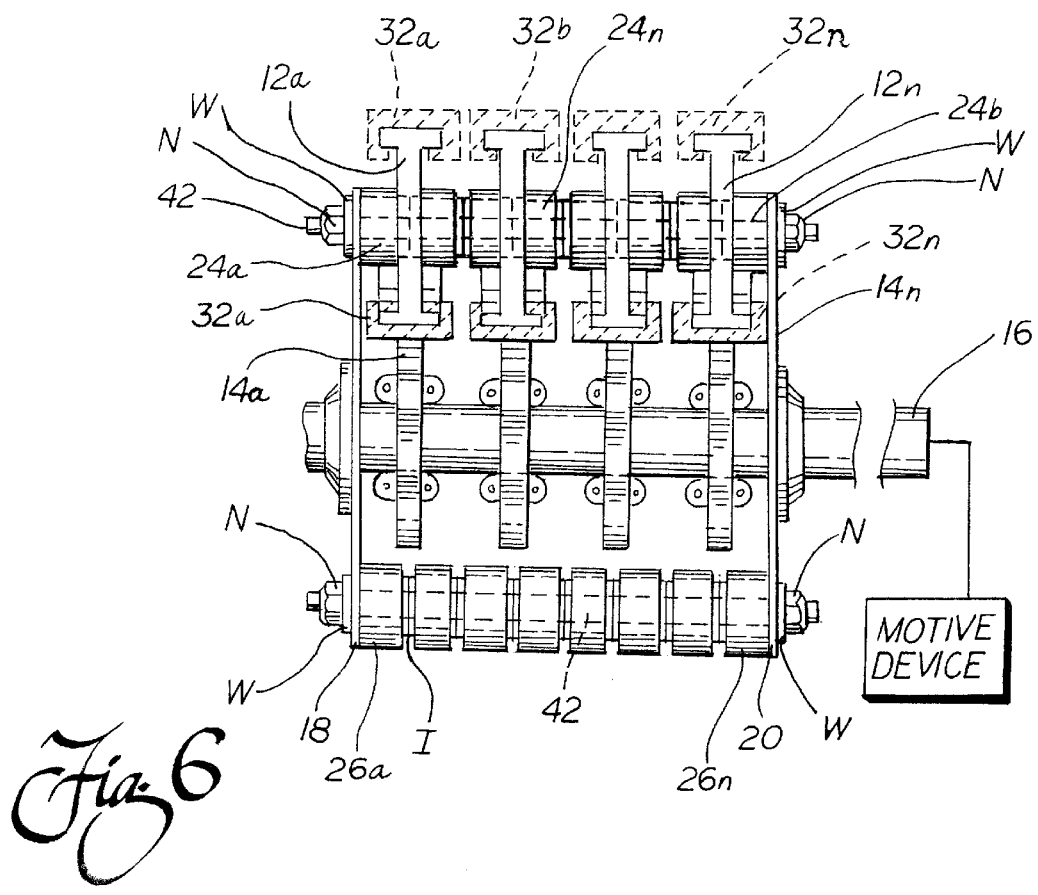
FIG. 6 is a front or rear end view of the intermediate drive for the conveyor system of FIG. 5.

As should also be appreciated, it is possible to create an intermediate drive 10 for simultaneously gang-driving a plurality of conveyor belts 32a . . . 32n using the concepts described above. As shown in FIGS. 5 and 6, the guide rails 12a . . . 12n, drive sprockets 14a . . . 14n, and corresponding conveyor belts 32a . . . 32n can essentially be the same as previously described. However, rather than supporting the shaft 16 from opposite sides of the same guide rail, a first support (which may be in the form of a plate 18) is suspended from a first guide rail 12a, while a second plate (such as plate 20) is suspended from a second guide rail 12n. In the most preferred embodiment, the first support plate 18 is suspended from the first-in-line guide rail 12a, while the second support plate 20 is suspended from the last-in-line guide rail 12n (in the illustrated embodiment, 12d, since there are four parallel guide rails, 12a, 12b, 12c, and 12d). As described above, each support or support plate 18, 20 includes an aperture A for receiving the shaft 16. A bushing 22 may be provided in each aperture A to provide a bearing surface for the shaft 16.

Adjacent to the top portion of the plate 18, 20, and on the side of the corresponding guide rail 12a or 12n, a spacer 24a or 24b is provided. These spacers 24a, 24b ensure that the proper spacing is created between each support plate 18, 20 and the side of the corresponding guide rail 12a or 12n to avoid creating any interference with the adjacent conveyor belt 32a or 32n as it traverses along the forward run F. Similar spacers 24n are also provided between each adjacent guide rail 12n. The spacers 24n may be separate components that are carried on connectors (such as threaded stud 42) used to connect the guide rails 12a . . . 12n and support plates 18, 20 together. Nuts N with optional washers W may then be placed on the ends of the connector, such as stud 42, to complete the assembly. As explained above and shown in FIG. 1b, the spacers 24a, 24b also preferably include recessed portions 27 that fit in locator holes H formed in both the plates 18, 20 and each guide rail 12a . . . 12n (see, e.g., FIG. 1b).

A spacer may also be provided between the bottom portions of the support plates 18, 20. As shown in FIG. 5, the spacer may actually take the form of a plurality of modular spacers 26a . . . 26n, each being the same size as spacers 24a . . . 24n and having recessed end portions 27 for insertion in locator holes H, as described above. Together, the abutting recessed portions 27 of each adjacent pair of spacers 26a, 26b create a notch, marker or other indicia I that is usually nearly perfectly aligned with the spacers 24a, 24n, which should meet at the centerline of each guide rail 12a . . . 12n. Thus, the indicia I may assist in aligning the sprocket 14a . . . 14n with the center of the corresponding guide rail 12a . . . 12n. All the spacers 26 may be carried on a single connector (such as threaded stud 42) spanning through the holes H in the plates 18, 20, with nuts N or the like secured to the ends. Washers W may also be used to provide an engagement surface for the nut N and ensure that it remains properly tightened down. The spacer(s) employed may be of any width depending on the particular width of the corresponding belt.

In both the single and multiple lane conveyor systems, the spacers 26a, 26b may optionally take the form of L-shaped guards 50a, 50b, as shown in FIG. 7. These guards 50a, 50b include inwardly and upwardly projecting portions that together serve to partially surround the corresponding sprocket 14 and guard against interference from outside objects. To prevent debris from becoming trapped in the guards 50a, 50b, and to allow fluid to flow through, such as during cleaning, a space or gap G is preferably provided between the inwardly projecting portions. The guards 50a, 50b may be fabricated of unitary pieces of molded material having an integral bushing for receiving the stud 28, 42 or other connector extending between the plates 18, 20, or alternatively, may include a recess (not shown) that snap-fits or slides over the spacers 26a, 26b.

Figure 8:
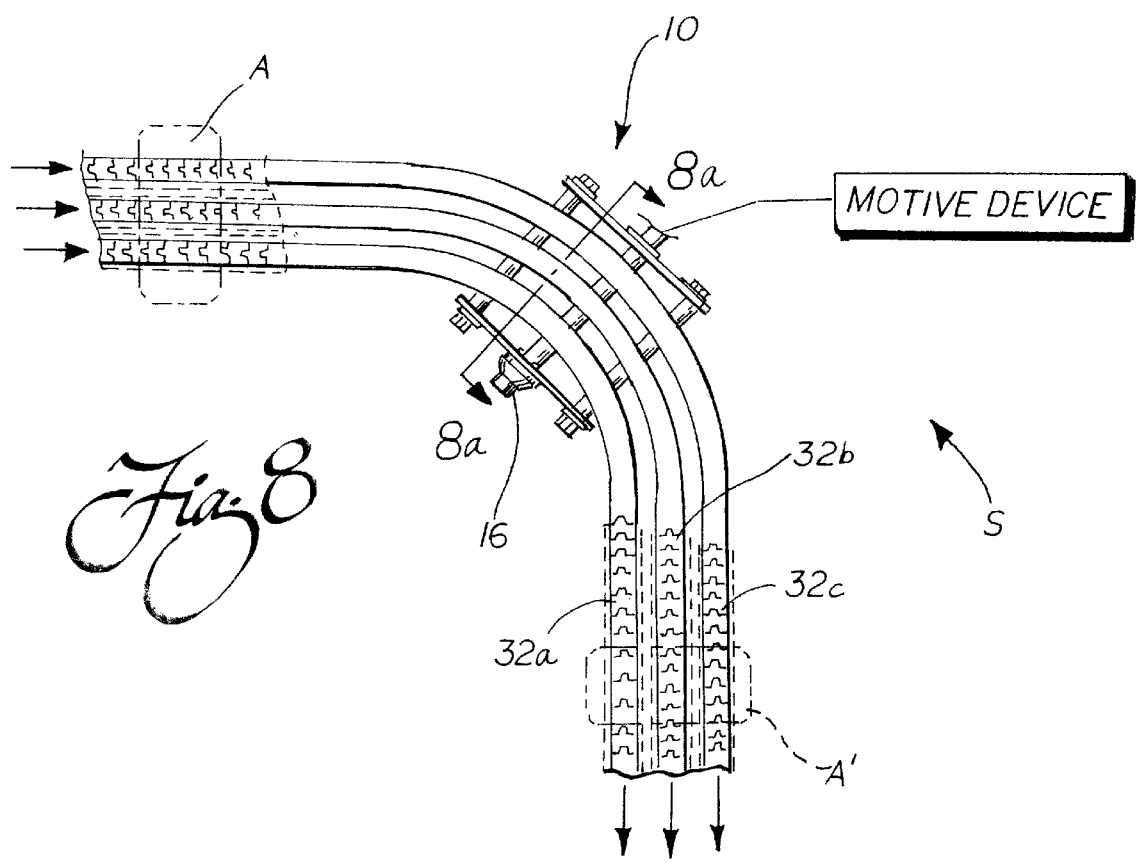
FIG. 8 is a top plan view of the intermediate drive unit in use on a curved section of a narrow width conveyor system.
Figure 8A:
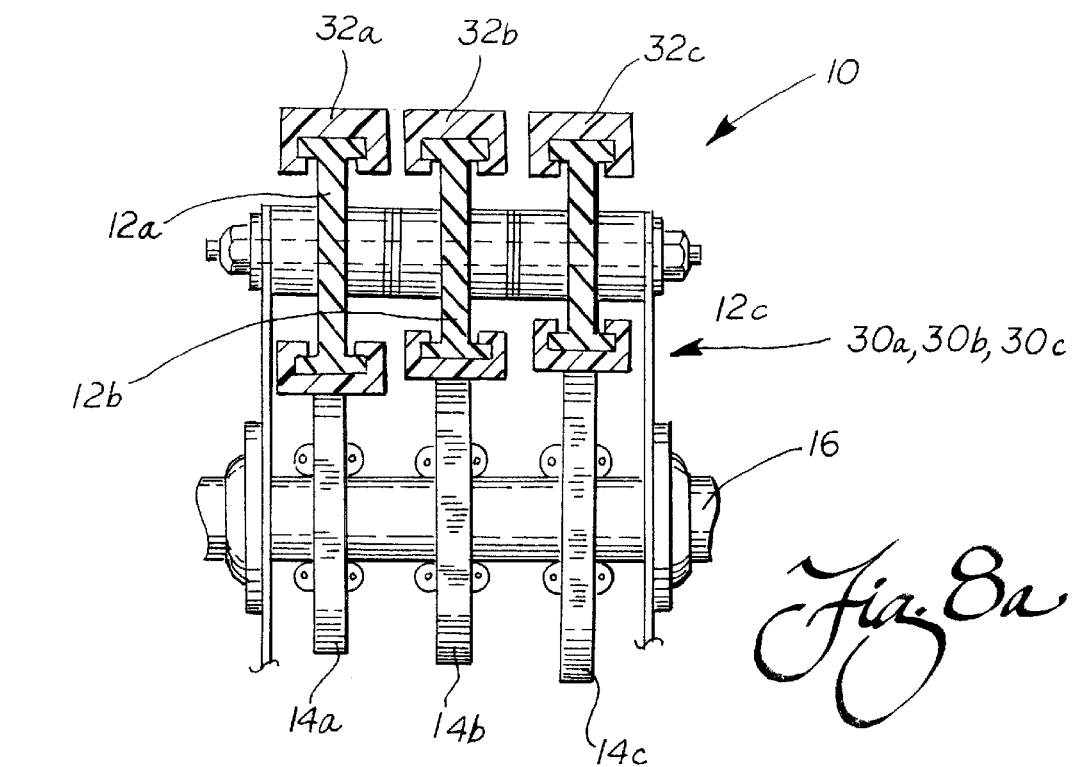

One possible use of the intermediate drive 10 of the present invention is along a curved section of a conveyor system S, as shown in FIGS. 8, 8a, and 9. Specifically, the intermediate drive 10 includes a plurality of sprockets 14a, 14b, 14b, each having a different size or diameter, as well as a different number of teeth (see FIG. 9). In the illustrated embodiment, the innermost sprocket 14a is the smallest and has the fewest number of teeth, while the outermost sprocket 14b is the largest and has the greatest number of teeth. Since the sprockets 14a–14b are coaxially mounted and gang driven, the larger sprocket 14c with the greater number of teeth thus causes the outermost belt 32c along the radius of the curve to move a greater distance for each revolution of the shaft 16. Hence, the outermost belt 32c moves at a slightly greater surface speed, which ensures that an article A, such as a loaf of bread, laying across and being transported by the belts 32a–32c maintains the same orientation upon exiting the system S that it had upon entering (compare reference characters A and A' in FIG. 8).

Since the sprockets 14a–14c are coaxially mounted, it is necessary to alter the contour of each recessed or curved portion 30 in each guide rail 12a, 12b, 12c (see FIG. 8a). The variable contours ensure that not only that the sprockets 14a–14c are properly juxtaposed to the recessed portion 30a, 30b, 30c, but also that the proper driving engagement is established between the teeth of the sprockets and the corresponding belt 32a–32c. As should be appreciated, the slope of the curved guide tracks also changes according to the resizing of the recessed portions 30a–30c. The different contours may be easily formed during the process used to form the guide rails 12a–12c. As should be appreciated from the foregoing description, the sprockets 14a–14c may be split. Also, the number of belts 32a . . . 32n that may be coaxially driven along the curve is not set at or limited to three. Moreover, the same sizes or diameters of sprockets 14a–14n could be intentionally used along the curve to intentionally introduce a skew in the article being conveyed.

The foregoing description of the various embodiments of the invention is presented for purposes of illustration and description. It is not intended to be exhaustive or to limit the invention to the precise form disclosed. Obvious modifications or variations are possible in light of the above teachings. The embodiments chosen were described to provide the best application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A conveyor system, comprising:
   at least one conveyor belt including a plurality of modular links having pairs of guide tabs;
   at least one elongated guide rail having first and second guide tracks for engaging the guide tabs and guiding the conveyor belt along a forward and a return run, respectively, said elongated guide rail having first and second spaced ends over which the belt travels in reversing from the forward to the return run and a recessed portion positioned between said ends along which said conveyor belt is guided; and
   a drive including at least one sprocket juxtaposed to said recessed portion of said elongated guide rail for engaging and driving said conveyor belt.

2. The conveyor system according to claim 1, wherein said recessed portion is formed along the return run and is contoured to correspond in shape to the periphery of said sprocket.

3. The conveyor system according to claim 1, wherein each guide tab projects inwardly from a depending arm on the corresponding link.

4. The conveyor system according to claim 1, wherein each said modular link further includes an apex and a pair of legs, said apex including a slot for receiving a transverse connector extending through an aperture in each leg of the pair of legs in an adjacent link, whereby the belt thus formed is capable of expanding and contracting in a longitudinal dimension.

5. The conveyor system according to claim 1, wherein said drive includes first and second support plates for supporting a shaft carrying said drive sprocket, wherein said support plates are carried by said guide rail.

6. The conveyor system according to claim 5, further including a bushing positioned in an aperture in each said support plate, whereby said busing provides a bearing surface for said shaft.

7. The conveyor system according to claim 5, further including a motive device for rotating the shaft.

8. The conveyor system according to claim 1, further including a plurality of guide rails for guiding a plurality of conveyor belts, and wherein said drive includes a plurality of sprockets mounted on a common shaft, each for engaging at least one of said conveyor belts, wherein each said guide rail is associated with at least one sprocket.

9. The conveyor system according to claim 8, wherein each of said plurality of guide rails is an I-beam guide rail.

10. The conveyor system according to claim 8, wherein said common shaft is supported by first and second supports, each being carried by at least one of said plurality of guide rails.

11. The conveyor system according to claim 10, further including at least one spacer for spacing each support from an adjacent guide rail or spacing two adjacent guide rails from each other.

12. The conveyor system according to claim 11, wherein each spacer includes recessed end portions for engaging locator holes in one of said guide rail or said support.

13. An intermediate drive in combination with a conveyor system having a plurality of conveyor belts, each having an outer conveying surface and being associated with a separate, elongated guide rail, each guide rail having a first end and a second, opposed end over which the corresponding belt is driven in an endless fashion and a recessed portion therebetween, comprising:

at least one drive sprocket positioned between the first and second ends of each elongated guide rail for engaging and driving each said conveyor belt in the same direction;

a shaft for supporting said drive sprockets adjacent to the recessed portion of each guide rail in engagement with the outer conveying surface of the corresponding belt; and first and second supports for supporting said shaft.

14. The drive for a conveyor system according to claim 13, wherein each said conveyor belt is formed of a plurality of modular links and each said sprocket includes a plurality of teeth adapted for engaging said links.

15. The drive for a conveyor system according to claim 13, wherein each said sprocket is a split sprocket including first and second halves held together by at least one fastener.

16. The drive for a conveyor system according to claim 13, wherein each of said first and second supports is a plate having an aperture for receiving said shaft.

17. The drive for a conveyor system according to claim 16, wherein a bushing is positioned in each said aperture to provide a bearing surface for said shaft.

18. The drive for a conveyor system according to claim 13, further including at least one spacer for positioning between each of said first and second supports and the corresponding guide rail and between adjacent pairs of guide rails.

19. A method for driving a plurality of conveyor belts, each having an outer conveying surface, along a plurality of separate guide rails, each guide rail having a recessed portion, comprising:

positioning a drive including a plurality of sprockets such that each said sprocket is juxtaposed to the outer surface of each said conveyor belt along the recessed portion of the corresponding guide rail; and rotating the drive sprockets to simultaneously drive the plurality of conveyor belts in the same direction along the recessed portion of each of the corresponding guide rails.

20. The method according to claim 19, wherein each said guide rail is an I-beam guide rail having forward and return runs, and positioning the drive juxtaposed to the guide rail includes suspending first and second support plates from at least two of said plurality of guide rails, each said support plate having an aperture for receiving a shaft carrying the plurality of sprockets.

21. The method of claim 19, wherein the sprockets are coaxially mounted and the rotating step includes rotating the drive sprockets in the same direction.

22. A conveyor system, comprising:

a plurality of conveyor belts, each including a plurality of modular links;

a guide rail corresponding to and guiding each said conveyor belt, each said guide rail having a contoured recessed portion along which said conveyor belt is guided; and a drive including a plurality of sprockets, each having a different diameter, and each juxtaposed to said recessed portion of said guide rail for engaging and driving said conveyor belt;

wherein the contour of the recessed portion on each said guide rail corresponds to the diameter of the corresponding sprocket.

23. The conveyor system according to claim 22, wherein the drive is positioned along a curve in the conveyor system, and the sprockets are coaxially mounted and gang-driven and sized to ensure that an outermost conveyor belt is driven at a higher rate of speed than an inner conveyor belt along the curve, whereby an article being carried on the belts is kept at a desired orientation as the curve is traversed.

24. The conveyor system according to claim 23, wherein the sprocket for engaging an innermost conveyor belt has a smaller diameter and a fewer number of teeth than the sprocket for engaging the outermost conveyor belt in the curve.

25. The conveyor system according to claim 22, wherein each of the plurality of modular links forming each conveyor belt include a pair of depending arms carrying inwardly extending guide tabs for engaging corresponding upper and lower guide tracks on the guide rail in moving along the forward and return runs.

26. A drive for use in a curved section of a conveyor system having a plurality of conveyor belts, each belt being associated with a separate guide rail having a recessed portion with a different contour, comprising:

a plurality of coaxially mounted drive sprockets having different diameters corresponding to a relative position of the adjacent conveyor belt along a radius of the curve;

a shaft for coaxially supporting said drive sprockets; and first and second supports for supporting said shaft;

whereby said shaft is supported such that each said sprocket is for positioning in juxtaposition to said recessed portion of each separate guide rail for driving the corresponding belt at a different speed.

27. The drive according to claim 25, wherein the sprocket for use on an innermost conveyor belt has a smaller diameter than the sprocket for use on the outermost conveyor belt in the curve.

* * * * *